US008966224B2

(12) United States Patent
Archer et al.

(10) Patent No.: US 8,966,224 B2
(45) Date of Patent: *Feb. 24, 2015

(54) PERFORMING A DETERMINISTIC REDUCTION OPERATION IN A PARALLEL COMPUTER

(71) Applicant: International Business Machines Corporation, Armonk, NY (US)

(72) Inventors: Charles J. Archer, Rochester, MN (US); Michael A. Blocksome, Rochester, MN (US); Joseph D. Ratterman, Seattle, WA (US); Brian E. Smith, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,985

(22) Filed: Nov. 1, 2012

(65) Prior Publication Data

US 2013/0073832 A1   Mar. 21, 2013

Related U.S. Application Data

(63) Continuation of application No. 12/789,986, filed on May 28, 2010.

(51) Int. Cl.
*G06F 9/46* (2006.01)
*G06F 15/173* (2006.01)

(52) U.S. Cl.
CPC ............................. *G06F 15/17318* (2013.01)
USPC .......................................................... 712/28

(58) Field of Classification Search
USPC ..................................................... 712/28, 31
See application file for complete search history.

(56) References Cited

U.S. PATENT DOCUMENTS 4,715,032 A   12/1987   Nilsson
4,843,540 A    6/1989   Stolfo
(Continued)

FOREIGN PATENT DOCUMENTS

EP   1835414 A2    9/2007
JP   2000156039 A  6/2000
(Continued)

OTHER PUBLICATIONS

"Swap Two Variables Using XOR", BetterExplained.com (online), URL: http://betterexplained.com/articles/swap-two-variables-using-xor/, accessed Jan. 16, 2007, 11 pages.
(Continued)

*Primary Examiner* — Andrew Caldwell
*Assistant Examiner* — Yuqing Xiao
(74) *Attorney, Agent, or Firm* — Biggers Kennedy Lenart Spraggins LLP (57) ABSTRACT

A parallel computer that includes compute nodes having computer processors and a CAU (Collectives Acceleration Unit) that couples processors to one another for data communications. In embodiments of the present invention, deterministic reduction operation include: organizing processors of the parallel computer and a CAU into a branched tree topology, where the CAU is a root of the branched tree topology and the processors are children of the root CAU; establishing a receive buffer that includes receive elements associated with processors and configured to store the associated processor's contribution data; receiving, in any order from the processors, each processor's contribution data; tracking receipt of each processor's contribution data; and reducing, the contribution data in a predefined order, only after receipt of contribution data from all processors in the branched tree topology.

5 Claims, 7 Drawing Sheets

(56) References Cited

U.S. PATENT DOCUMENTS

| | | |
|---|---|---|
| 5,101,480 A | 3/1992 | Shin et al. |
| 5,105,424 A | 4/1992 | Flaig et al. |
| 5,333,279 A | 7/1994 | Dunning |
| 5,377,333 A | 12/1994 | Nakagoshi et al. |
| 5,513,371 A | 4/1996 | Cypher et al. |
| 5,541,914 A | 7/1996 | Krishnamoorthy et al. |
| 5,590,334 A | 12/1996 | Saulpaugh et al. |
| 5,617,538 A | 4/1997 | Heller |
| 5,668,815 A | 9/1997 | Gittinger et al. |
| 5,721,828 A | 2/1998 | Frisch |
| 5,822,604 A | 10/1998 | Ogasawara et al. |
| 5,822,605 A | 10/1998 | Higuchi et al. |
| 5,826,049 A | 10/1998 | Ogata et al. |
| 5,832,215 A | 11/1998 | Kato et al. |
| 5,864,712 A | 1/1999 | Carmichael et al. |
| 5,875,329 A | 2/1999 | Shan |
| 5,878,241 A | 3/1999 | Wilkinson et al. |
| 5,892,923 A | 4/1999 | Yasuda et al. |
| 5,937,202 A | 8/1999 | Crosetto |
| 5,949,988 A | 9/1999 | Feisullin et al. |
| 5,958,017 A | 9/1999 | Scott et al. |
| 6,000,024 A | 12/1999 | Maddox |
| 6,038,651 A | 3/2000 | VanHuben et al. |
| 6,067,609 A | 5/2000 | Meeker et al. |
| 6,076,131 A | 6/2000 | Nugent |
| 6,108,692 A | 8/2000 | Van Seters et al. |
| 6,212,617 B1 | 4/2001 | Hardwick |
| 6,272,548 B1 | 8/2001 | Cotter et al. |
| 6,289,424 B1 | 9/2001 | Stevens |
| 6,292,822 B1 | 9/2001 | Hardwick |
| 6,334,138 B1 | 12/2001 | Kureya |
| 6,473,849 B1 | 10/2002 | Keller et al. |
| 6,480,885 B1 | 11/2002 | Olivier |
| 6,647,438 B1 | 11/2003 | Connor et al. |
| 6,691,101 B2 | 2/2004 | MacNicol et al. |
| 6,714,552 B1 | 3/2004 | Cotter |
| 6,742,063 B1 | 5/2004 | Hellum et al. |
| 6,754,211 B1 | 6/2004 | Brown |
| 6,834,301 B1 | 12/2004 | Hanchett |
| 6,914,606 B2 | 7/2005 | Amemiya et al. |
| 6,954,806 B2 | 10/2005 | Yosimoto et al. |
| 6,982,960 B2 | 1/2006 | Lee et al. |
| 7,010,576 B2 | 3/2006 | Bae |
| 7,073,043 B2 | 7/2006 | Arimilli et al. |
| 7,133,359 B2 | 11/2006 | Weis |
| 7,143,392 B2 | 11/2006 | Ii et al. |
| 7,171,484 B1 | 1/2007 | Krause et al. |
| 7,203,743 B2 | 4/2007 | Shah-Heydari |
| 7,263,598 B2 | 8/2007 | Ambuel |
| 7,263,698 B2 | 8/2007 | Wildhagen et al. |
| 7,284,033 B2 | 10/2007 | Jhani |
| 7,352,739 B1 | 4/2008 | Rangarajan et al. |
| 7,363,474 B2 | 4/2008 | Rodgers et al. |
| 7,487,501 B2 | 2/2009 | Silvera et al. |
| 7,496,699 B2 | 2/2009 | Pope et al. |
| 7,509,244 B1 | 3/2009 | Shakeri et al. |
| 7,539,989 B2 | 5/2009 | Blackmore et al. |
| 7,555,566 B2 | 6/2009 | Blumrich et al. |
| 7,571,439 B1 | 8/2009 | Rabinovici et al. |
| 7,587,516 B2 | 9/2009 | Bhanot et al. |
| 7,590,983 B2 | 9/2009 | Neiman et al. |
| 7,600,095 B2 | 10/2009 | Archer et al. |
| 7,613,134 B2 | 11/2009 | Rangaraajan et al. |
| 7,640,315 B1 | 12/2009 | Meyer et al. |
| 7,664,110 B1 | 2/2010 | Lovett et al. |
| 7,673,011 B2 | 3/2010 | Archer et al. |
| 7,697,443 B2 | 4/2010 | Archer et al. |
| 7,707,366 B2 | 4/2010 | Tagawa |
| 7,725,329 B2 | 5/2010 | Kil et al. |
| 7,739,451 B1 | 6/2010 | Wiedenman et al. |
| 7,774,448 B2 | 8/2010 | Shah-Heydari |
| 7,796,527 B2 | 9/2010 | Archer et al. |
| 7,808,930 B2 | 10/2010 | Boers et al. |
| 7,835,378 B2 | 11/2010 | Wijnands et al. |
| 7,853,639 B2 | 12/2010 | Archer et al. |
| 7,936,681 B2 | 5/2011 | Gong et al. |
| 7,948,999 B2 | 5/2011 | Blocksome et al. |
| 7,974,221 B2 | 7/2011 | Tamassia et al. |
| 7,984,448 B2 | 7/2011 | Almasi et al. |
| 7,991,857 B2 | 8/2011 | Berg et al. |
| 8,090,797 B2 | 1/2012 | Chinta et al. |
| 8,131,825 B2 | 3/2012 | Nord et al. |
| 8,161,268 B2 | 4/2012 | Faraj |
| 8,161,480 B2 | 4/2012 | Archer et al. |
| 8,326,943 B2 | 12/2012 | Chinta et al. |
| 8,365,186 B2 | 1/2013 | Faraj et al. |
| 8,436,720 B2 | 5/2013 | Archer et al. |
| 8,565,089 B2 | 10/2013 | Archer et al. |
| 2002/0016901 A1 | 2/2002 | Carvey et al. |
| 2002/0054051 A1 | 5/2002 | Ladd |
| 2002/0065984 A1 | 5/2002 | Thompson et al. |
| 2002/0091819 A1 | 7/2002 | Melchione et al. |
| 2002/0144027 A1 | 10/2002 | Schmisseur |
| 2003/0041173 A1 | 2/2003 | Hoyle |
| 2003/0182376 A1 | 9/2003 | Smith |
| 2003/0188054 A1 | 10/2003 | Yosimoto et al. |
| 2003/0212877 A1 | 11/2003 | Dally et al. |
| 2003/0225852 A1 | 12/2003 | Bae |
| 2004/0034678 A1 | 2/2004 | Kuszmaul et al. |
| 2004/0073590 A1 | 4/2004 | Bhanot et al. |
| 2004/0107387 A1 | 6/2004 | Larsson et al. |
| 2005/0094577 A1 | 5/2005 | Ashwood-Smith |
| 2005/0135395 A1 | 6/2005 | Fan et al. |
| 2005/0165980 A1 | 7/2005 | Clayton et al. |
| 2005/0243711 A1 | 11/2005 | Alicherry et al. |
| 2006/0156312 A1 | 7/2006 | Supalov |
| 2006/0168359 A1 | 7/2006 | Bissessur et al. |
| 2006/0179181 A1 | 8/2006 | Seong |
| 2006/0182137 A1 | 8/2006 | Zhou et al. |
| 2006/0277323 A1 | 12/2006 | Joublin et al. |
| 2006/0282838 A1 | 12/2006 | Gupta et al. |
| 2007/0110063 A1 | 5/2007 | Tang et al. |
| 2007/0174558 A1 | 7/2007 | Jia et al. |
| 2007/0226686 A1 | 9/2007 | Beardslee et al. |
| 2007/0242611 A1 | 10/2007 | Archer et al. |
| 2007/0245122 A1 | 10/2007 | Archer et al. |
| 2007/0245163 A1 | 10/2007 | Lu et al. |
| 2007/0288935 A1 | 12/2007 | Tannenbaum et al. |
| 2007/0294666 A1 | 12/2007 | Papakipos et al. |
| 2007/0294681 A1 | 12/2007 | Tuck et al. |
| 2008/0022079 A1 | 1/2008 | Archer et al. |
| 2008/0077366 A1 | 3/2008 | Neuse et al. |
| 2008/0109569 A1 | 5/2008 | Leonard et al. |
| 2008/0127146 A1 | 5/2008 | Liao et al. |
| 2008/0155249 A1 | 6/2008 | Backof et al. |
| 2008/0177505 A1 | 7/2008 | Volponi |
| 2008/0201603 A1 | 8/2008 | Ritz et al. |
| 2008/0250325 A1 | 10/2008 | Feigenbaum et al. |
| 2008/0263320 A1 | 10/2008 | Archer et al. |
| 2008/0263329 A1 | 10/2008 | Archer et al. |
| 2008/0273543 A1* | 11/2008 | Blocksome et al. .......... 370/406 |
| 2008/0288949 A1 | 11/2008 | Bohra et al. |
| 2008/0301683 A1 | 12/2008 | Archer et al. |
| 2009/0006662 A1 | 1/2009 | Chen |
| 2009/0006663 A1 | 1/2009 | Archer et al. |
| 2009/0006808 A1* | 1/2009 | Blumrich et al. ............... 712/12 |
| 2009/0019218 A1 | 1/2009 | Sinclair et al. |
| 2009/0019258 A1 | 1/2009 | Shi |
| 2009/0037377 A1 | 2/2009 | Archer et al. |
| 2009/0037511 A1 | 2/2009 | Almasi et al. |
| 2009/0037707 A1 | 2/2009 | Blocksome |
| 2009/0040946 A1 | 2/2009 | Archer et al. |
| 2009/0043910 A1 | 2/2009 | Barsness et al. |
| 2009/0052462 A1 | 2/2009 | Archer et al. |
| 2009/0055474 A1 | 2/2009 | Archer et al. |
| 2009/0063815 A1 | 3/2009 | Arimilli et al. |
| 2009/0064140 A1* | 3/2009 | Arimilli et al. ............... 718/100 |
| 2009/0064176 A1 | 3/2009 | Ohly et al. |
| 2009/0067334 A1 | 3/2009 | Archer et al. |
| 2009/0154486 A1 | 6/2009 | Archer et al. |
| 2009/0196361 A1 | 8/2009 | Chan et al. |
| 2009/0240838 A1 | 9/2009 | Berg et al. |
| 2009/0240915 A1 | 9/2009 | Faraj |
| 2009/0245134 A1 | 10/2009 | Archer et al. |

(56) References Cited

U.S. PATENT DOCUMENTS

| | | |
|---|---|---|
| 2009/0248712 A1 | 10/2009 | Yuan |
| 2009/0259713 A1 | 10/2009 | Blumrich et al. |
| 2009/0292905 A1 | 11/2009 | Faraj |
| 2009/0307467 A1 | 12/2009 | Faraj |
| 2009/0310544 A1 | 12/2009 | Jain et al. |
| 2009/0319621 A1 | 12/2009 | Barsness et al. |
| 2010/0017420 A1 | 1/2010 | Archer et al. |
| 2010/0023631 A1 | 1/2010 | Archer et al. |
| 2010/0057738 A1 | 3/2010 | Ianni |
| 2010/0082788 A1 | 4/2010 | Mundy |
| 2010/0122268 A1 | 5/2010 | Jia |
| 2010/0185718 A1 | 7/2010 | Archer et al. |
| 2010/0191911 A1 | 7/2010 | Heddes et al. |
| 2010/0274997 A1 | 10/2010 | Archer et al. |
| 2011/0010471 A1 | 1/2011 | Heidelberger et al. |
| 2011/0119673 A1 | 5/2011 | Bloch et al. |
| 2011/0125974 A1 | 5/2011 | Anderson |
| 2011/0153908 A1 | 6/2011 | Schaefer et al. |
| 2011/0179134 A1 | 7/2011 | Mayo et al. |
| 2011/0238950 A1 | 9/2011 | Archer et al. |
| 2011/0258245 A1 | 10/2011 | Blocksome et al. |
| 2011/0258627 A1 | 10/2011 | Faraj et al. |
| 2011/0267197 A1 | 11/2011 | Archer et al. |
| 2011/0270986 A1 | 11/2011 | Archer et al. |
| 2011/0289177 A1 | 11/2011 | Archer et al. |
| 2011/0296137 A1 | 12/2011 | Archer et al. |
| 2011/0296139 A1 | 12/2011 | Archer et al. |
| 2012/0066284 A1 | 3/2012 | Archer et al. |
| 2012/0117361 A1 | 5/2012 | Archer et al. |
| 2012/0179881 A1 | 7/2012 | Archer et al. |
| 2012/0197882 A1 | 8/2012 | Jensen |
| 2012/0216021 A1 | 8/2012 | Archer et al. |
| 2012/0317399 A1 | 12/2012 | Blocksome et al. |
| 2012/0331270 A1 | 12/2012 | Archer et al. |
| 2013/0042088 A1 | 2/2013 | Archer et al. |
| 2013/0042245 A1 | 2/2013 | Archer et al. |
| 2013/0042254 A1 | 2/2013 | Archer et al. |
| 2013/0067198 A1 | 3/2013 | Archer et al. |
| 2013/0073603 A1 | 3/2013 | Archer et al. |
| 2013/0073832 A1 | 3/2013 | Archer et al. |
| 2013/0074098 A1 | 3/2013 | Archer et al. |
| 2013/0080563 A1 | 3/2013 | Archer et al. |
| 2013/0086358 A1 | 4/2013 | Archer et al. |
| 2013/0111496 A1 | 5/2013 | Archer et al. |
| 2013/0151713 A1 | 6/2013 | Faraj |
| 2013/0173675 A1 | 7/2013 | Archer et al. |
| 2013/0212145 A1 | 8/2013 | Archer et al. |
| 2013/0212558 A1 | 8/2013 | Archer et al. |
| 2013/0212561 A1 | 8/2013 | Archer et al. |
| 2013/0246533 A1 | 9/2013 | Archer et al. |
| 2013/0290673 A1 | 10/2013 | Archer et al. |

FOREIGN PATENT DOCUMENTS

| | | |
|---|---|---|
| JP | 2003317487 A | 11/2003 |
| WO | WO 2007/057281 A1 | 5/2007 |

OTHER PUBLICATIONS

Notice of Allowance U.S. Appl. No. 12/124,745, Mar. 6, 2013.
Final Office Action U.S. Appl. No. 12/770,286, Jan. 29, 2013.
Final Office Action U.S. Appl. No. 12/748,594, Mar. 22, 2013.
Notice of Allowance U.S. Appl. No. 12/790,037, Mar. 15, 2013.
Final Office Action U.S. Appl. No. 13/459,832, Jan. 4, 2013.
Notice of Allowance U.S. Appl. No. 13/585,993, Jan. 31, 2013.
Office Action U.S. Appl. No. 13/672,740, Apr. 2, 2013.
Sunggu Lee; Shin, K.G., "Interleaved all-to-all reliable broadcast on meshes and hypercubes," Parallel and Distributed Systems, IEEE Transactions on, vol. 5, pp. 449-458, May 1994.
Bruck J., et al. Efficient Algorithms for all-to-all communications in multiportmessage-passing systems, Parallel and Distributed System, IEEE Transactions on, vol. 8, Issue: 11, pp. 1143-1156, Nov. 1997.
U.S. Appl. No. 60/271,124, filed Feb. 24, 2001, pp. 12-13, 27 and 42-43.
Office Action Dated Mar. 4, 2008 in U.S. Appl. No. 11/279,620.
Office Action Dated Sep. 3, 2008 in U.S. Appl. No. 11/279,620.
Office Action Dated Dec. 29, 2008 in U.S. Appl. No. 11/279,620.
Office Action Dated Apr. 3, 2009 in U.S. Appl. No. 11/769,367.
Office Action Dated Dec. 13, 2007 in U.S. Appl. No. 11/459,387.
Office Action Dated Jul. 11, 2008 in U.S. Appl. No. 11/459,387.
Office Action Dated Mar. 18, 2009 in U.S. Appl. No. 11/459,387.
Office Action Dated Feb. 9, 2009 in U.S. Appl. No. 11/737,286.
Tanenbaum, A., "Structured Computer Organization", Jan. 1984, pp. 1-5, Second Edition, Prentice-Hall, Inc., Englewood Cliffs, N.J., USA, ISBN: 0-13-854489-1.
Shaw, D., et al., DADO: A Tree-Structured Machine Architecture for Production Systems, Proceedings, $2^{nd}$ National Conference on Artificial Intelligence (AAAI-82), Aug. 1982, pp. 242-46, AAAI Press, Menlo Park, California.
Rosenberg, J., "Dictionary of Computers, Information Processing & Telecommunications", Sep. 1987, 5 pages, Second Edition, John Wiley & Sons, New York.
Sistare et al., "Optimization of MPI collectives on clusters of large-scale SMP's", Conference on High Performance Networking and Computing, Proceedings of the 1999 ACM/IEEE Conference on Supercomputing; Nov. 1999, pp. 1-18, ACM, New York, USA.
Office Action, U.S. Appl. No. 12/789,986, Jun. 10, 2013, pp. 1-31.
Herbordt, et al., "Computing Parallel Prefix and Reduction Using Coterie Structures", Frontiers of Massively Parallel Computation, Oct. 1992, pp. 141-149, IEEE Computer Society, USA.
Fisher, A., et al., "Computing the Hough Transform on a Scan Line Array Processor [image processing] ", IEEE Transactions on Pattern Analysis and Machine Intelligence, vol. 11, Issue: 3, Mar. 1989, pp. 262-265, IEEE Xplore Digital Library, USA.
Matsuda, et al., "Efficient MPI Collective Operations for Clusters in Long-and-Fast Networks", pp. 1-9, IEEE International Conference on Cluster Computing, Sep. 2006, IEEE Computer Society, USA.
Oh, et al., "An All-Reduce Operation in Star Networks Using All-to-All Broadcast Communication Patterns", Computational Science—ICCS 2005, Lecture Notes in Computer Science, vol. 3514, May 2005, pp. 419-426, Springer-Verlag, Berlin Heidelberg.
Yuan, et al., "Bandwidth Efficient All-reduce Operation on Tree Topologies", IEEE IPDPS Workshop on High-Level Parallel Programming Models and Supportive Environments, Mar. 2007, pp. 1-8, IEEE Xplore Digital Library, USA.
Edmonds et al., "AM++: A Generalized Active Message Framework", The 19th International Conference on Parallel Architectures and Compilation Techniques (PACT'10), Sep. 2010, pp. 1-10, ACM, New York, NY USA, ISBN: 978-1-4503-0178-7.
Bangalore, et al., "Extending the Message Passing Interface (MPI)", Proceedings of the 1994 Conference on Scalable Parallel Libraries, Oct 1994, pp. 106-118, pp. 106-118, IEEE Computer Society Press, USA, DOI: 10.1109/SPLC.1994.376998.
Bafna, et al., "Coprocessor Design to Support MPI Primitives in Configurable Multiprocessors", *Integration, The VLSI Journal*, vol. 40, Issue: 3, pp. 235-252, Apr. 2007, Elsevier Science Publishers B. V. Amsterdam, The Netherlands, The Netherlands.
Keller, et al., "MPI Development Tools and Applications for the Grid", In Workshop on Grid Applications and Programming Tools, Jun. 2003, pp. 1-12, Innovative Computing Laboratory, Computer Science Department, University of Tennessee, Knoxville, TN, USA.
Tang, et al., "Optimizing Threaded MPI Execution on SMP Clusters", Proceedings of the 15th International Conference on Supercomputing (ICS '01), Jun. 2001, pp. 381-392, ACM New York, USA.
Office Action, U.S. Appl. No. 13/166,183, Feb. 24, 2014, pp. 1-22.
Office Action, U.S. Appl. No. 13/206,116, Feb. 7, 2014 pp. 1-32.
Faraj, A., et al. "Automatic Generation and Tuning of MPI Collective Communication Routines", ICS' 05, Jun. 20-22, 2005, Boston, MA, USA. pp. 393-402, ACM.
Shrimali, G., et al., "Building Packet Buffers Using Interleaved Memories", (Proc. Sixth Workshop High Performance Switching and Routing (HPSR '05), May 2005, pp. 1-5, IEEE.
Ong, H., et al., "Kernel-level Single System Image for Petascale Computing", SIGOPS Oper. Syst. Rev., Apr. 2006, pp. 50-54, vol. 40, No. 2, ACM, New York, NY, USA.

(56) References Cited

OTHER PUBLICATIONS

Foster, I., et al., "Message Passing and Threads," Sourcebook of Parallel Computing, (Month Unknown) 2003, pp. 301-317, Morgan Kaufmann Publishers Inc. URL: http://web.eecs.utk.edu/~dongarra/WEB-PAGES/SPRING-2006/chapter10.pdf.

Simonsson, P., "Implementation of a Distributed Shared Memory using MPI," Chalmers University of Technology and Goteborg University, 2004, Supervised together with Anders Gidenstam, Master's Thesis, Finished Jan. 11, 2005, pp. 1-98, Goteborg, Sweden.

Message Passing Interface Forum,"MPI: A Message-Passing Interface Standard Version 2.2", MPI Specification, Sep. 4, 2009, pp. 1-647, High Performance Computing Center Stuttgart (HLRS).

Vetter, J., et al., "Real-Time Performance Monitoring, Adaptive Control, and Interactive Steering of Computational Grids", International Journal of High Performance Computing Applications Winter 2000, pp. 357-366 (10 Pages), vol. 14, No. 4, Sage Publications, Inc. Thousand Oaks, CA, USA.

Wikipedia, "Cache (computing)—Wikipedia, the free encyclopedia", Cache (computing), Edited by EmausBot, Jul. 22, 2011, Accessed Aug. 10, 2013, 6 Pages.

Wikipedia, "Fuzzy logic—Wikipedia, the free encyclopedia", Fuzzy Logic, Edited by Jeff Silvers, Aug. 1, 2011, Accessed Aug. 10, 2013, 10 Pages.

Wikipedia, "Depth-first search—Wikipedia, the free encyclopedia", http://web.archive.org/web/20070505212029/http://en.wikipedia.org/wiki/Depth-first_search, Apr. 29, 2009, pp. 1-5.

Sistare, S., et al., "Optimization of MPI collectives on clusters of large-scale SMP's", Conference on High Performance Networking and Computing, Proceedings of the 1999 ACM/IEEE Conference on Supercomputing; Nov. 1999, pp. 1-14, ACM, New York, NY, USA.

Tanenbaum, A., "Structured Computer Organization", Jan. 1984, pp. 1-5, Second Edition, Prentice-Hall, Inc., Englewood Cliffs, NJ, USA, ISBN: 0-13-854489-1.

Shaw, D., et al., DADO: A Tree-Structured Machine Architecture for Production Systems, AAAI-82 Proceedings, Jan. 1982, AAAI (www.aaai.org), pp. 242-46, AAAI Press.

Better Explained, "Swap two variables using XOR I BetterExplained", http://betterexplained.com/articles/swap-two-variables-using-xor, Accessed Jun. 4, 2011, pp. 1-8.

Rosenberg, J., "Dictionary of Computers, Information Processing & Telecommunications", Sep. 1987, pp. 1-5, Second Edition, John Wiley & Sons, New York, NY, USA.

\* cited by examiner

PERFORMING A DETERMINISTIC REDUCTION OPERATION IN A PARALLEL COMPUTER

CROSS-REFERENCE TO RELATED APPLICATION

This application is a continuation application of and claims priority from U.S. patent application Ser. No. 12/789,986, filed on May 28, 2010.

STATEMENT REGARDING FEDERALLY SPONSORED RESEARCH OR DEVELOPMENT

This invention was made with Government support under Contract No. HR0011-07-9-0002 awarded by the Department of Defense. The Government has certain rights in this invention.

BACKGROUND OF THE INVENTION

1. Field of the Invention

The field of the invention is data processing, or, more specifically, methods, apparatus, and products for performing a deterministic reduction operation in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer may be composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes, as well as operating components (CPUs and the like) of compute nodes, may be organized in a network as a tree. In a tree network, nodes or components of nodes may be connected in a binary tree in which each node or component has a parent and two children (although some nodes or components may only have zero children or one child, depending on the hardware configuration). Other tree topologies include a branched tree topology in which a node or component of node has more than two children, and a highly branched tree topology in which one node has many children. Although a tree network typically is inefficient in point to point communication, a tree network does provide high bandwidth and low latency for certain collective operations, message passing operations where all compute nodes participate simultaneously, such as, for example, an allgather or allreduce operation.

SUMMARY OF THE INVENTION

Methods, apparatus, and products for performing a deterministic reduction operation in a parallel computer are disclosed. The parallel computer includes a plurality of compute nodes and each compute node includes a plurality of computer processors and a CAU (Collectives Acceleration Unit). The CAU couples computer processors of compute nodes to one another for data communications in a cluster data communications network. Performing a deterministic reduction operation in a parallel computer in accordance with embodiments of the present invention includes organizing a plurality of processors of the parallel computer and a CAU into a branched tree topology, where the CAU is a root of the branched tree topology and the processors are children of the root CAU; establishing a receive buffer that includes a plurality of receive elements, each receive element associated with one of the processors in the branched tree topology and configured to store the associated processor's contribution data; receiving, by the root CAU in any order from the processors in the branched tree topology, each processor's contribution data; tracking receipt of each processor's contribution data; and reducing, by the root CAU, only after receipt of contribution data from all processors in the branched tree topology, the contribution data stored in the receive buffer in a predefined order.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
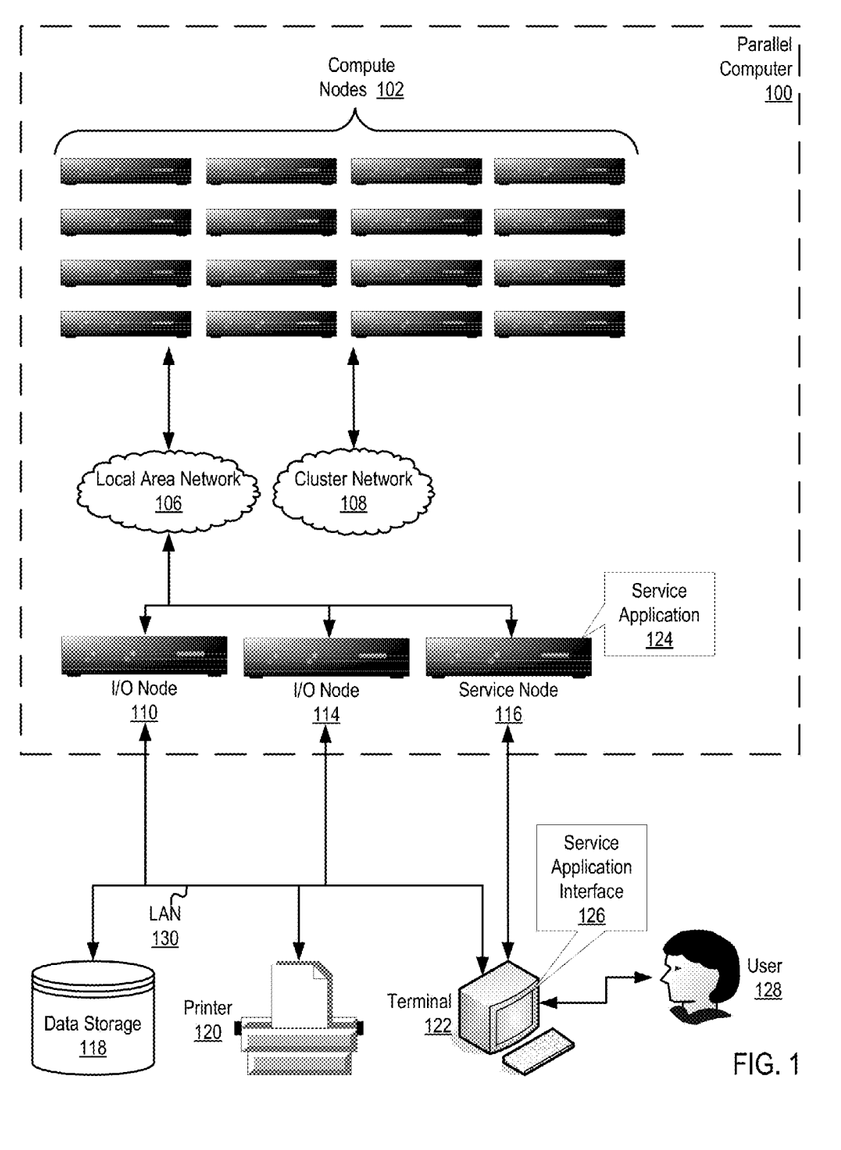
FIG. 1 illustrates an exemplary system for performing a deterministic reduction operation in a parallel computer according to embodiments of the present invention.

Exemplary methods, apparatus, and products for performing a deterministic reduction operation in a parallel computer in accordance with embodiments of the present invention are described with reference to the accompanying drawings, beginning with FIG. 1. FIG. 1 illustrates an exemplary system for performing a deterministic reduction operation in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by a cluster network (108) and a local area network (106). The cluster network (108) is a data communications network that configured such that the plurality of compute nodes (102) coupled to one another via the cluster network (108) may share resources, such as memory, computer processors, I/O bandwidth, and so on. Each compute node (102) includes a collective accelerations unit ('CAU'), a module of automated computing machinery comprising an aggregation of computer hardware and software that is configured to accelerate performance of collective operations performed by the compute nodes. Each CAU couples a compute node to at least one other CAU of another compute node for data communications. In this way, the CAU operates, from the perspective of a compute node, in a similar manner as a communications adapter of the compute node.

In addition to the cluster network (108) formed by links among the CAU of each compute node, the example compute nodes (102) of FIG. 1 are also coupled for data communications by a local area network ('LAN') (106). The LAN (106) may also couple the compute nodes to I/O Nodes (110, 114) and a service node (116). Each of the I/O nodes (110, 114) may provide I/O services between compute nodes (102) of and a set of I/O devices. In the example of FIG. 1, the I/O nodes (110, 114) are connected for data communications I/O devices (118, 120, and 122) through another LAN (130) implemented using high-speed Ethernet.

The service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In addition, components of the compute nodes (102), such as a processor or a CAU, may be organized into a tree topology for collective parallel operations on parallel computer (100). The components included in the tree topology upon which a collective parallel operation executes may be described as an operational group. Collective operations are implemented with data communications among the components of compute nodes of an operational group. Collective operations are those functions that involve all the components of compute nodes of an operational group. A collective operation is an operation, a message-passing computer program instruction that is executed simultaneously, that is, at approximately the same time, by all the components of compute nodes in an operational group. Collective operations are often built around point to point operations. A collective operation requires that all processes on all compute nodes having components within an operational group call the same collective operation with matching arguments. A 'broadcast' is an example of a collective operation for moving data among components of compute nodes of an operational group. A 'reduce' operation is an example of a collective operation that executes arithmetic or logical functions on data distributed among the components of compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a parallel computer. This specification sometimes uses MPI terminology for ease of explanation, although the use of MPI as such is not a requirement or limitation of the present invention.

Some collective operations have a single originating or receiving process running on a particular component of a compute node in an operational group. For example, in a 'broadcast' collective operation, the process on the component that distributes the data to all the other components in the operational group is an originating process. In a 'gather' operation, for example, the process on the component that received all the data from the other components is a receiving process. The component on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each component in the operational group. In scatter operation, all processes typically specify the same receive count. The send arguments are only significant to the root process, whose buffer actually contains sendcount*N elements of a given data type, where N is the number of processes in the given operational group of components. The send buffer is divided and dispersed to all processes (including the process on the logical root). Each component of the operation group is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked components into a receive buffer in a root component.

A reduce operation is also a many-to-one collective operation that includes an arithmetic or logical function performed on two data elements. All processes specify the same 'count' and the same arithmetic or logical function. After the reduction, all processes have sent count data elements from component send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or The system of FIG. 1 operates generally for performing a deterministic reduction operation in the parallel computer (100). The term 'deterministic' is used in this specification to describe a reduce operation as predictable, rather than variable. The term deterministic means an inevitable consequence of antecedent sufficient causes. The term deterministic is an antonym of the term 'stochastic' which means random or variable. In systems that perform reduce operations stochastically rather than deterministically, output of a sequence of reduce operations may be unpredictable.

The system of FIG. 1 performs a deterministic reduction operation by, first, organizing a plurality of processors of compute nodes (102) of the parallel computer (100) and a CAU into a branched tree topology. The CAU is a root of the branched tree topology and the processors are children of the root CAU. Any of a CAU, a processor, a user-level application, a messaging module, or the like, may then establish a receive buffer that includes a plurality of receive elements. Each of the receive elements is associated with one of the processors in the branched tree topology and is configured to store the associated processor's contribution data. Contribution data as the term is used in this specification refers to data provided to a reduction operation to be reduced by performing an arithmetic or logical operation on the contribution data. The root CAU then receives from the processors in the branched tree topology, each processor's contribution data in any order. The system of FIG. 1 also tracks receipt of each processor's contribution data. The root CAU reduces the contribution data stored in the receive buffer in a predefined order only after receipt of contribution data from all processors in the branched tree topology.

The arrangement of nodes, networks, and I/O devices making up the exemplary system illustrated in FIG. 1 are for explanation only, not for limitation of the present invention. Data processing systems useful in embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers configured according to embodiments of the present invention may include any number of compute nodes. In addition to Ethernet, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Performing a deterministic reduction operation in a parallel computer according to embodiments of the present invention may be generally implemented on a parallel computer that includes a plurality of compute nodes. In fact, such parallel computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer in which deterministic reductions are performed according to embodiments of the present invention. The compute node (152) of FIG. 2 includes at least one processor (156), in this example four processors (156). Each of the processors (156) includes eight processing cores (184). That is, in the example of FIG. 2, the compute node (152) includes four separate, 8-core central processing units ('CPUs') that operate together as a 32-way symmetric multiprocessing ('SMP') system. SMP is a computer hardware architecture in which two or more processors or processing cores are coupled to a shared main memory and are operate with a single operating system instance. Processors, or cores, configured for SMP may be interconnected using buses, crossbar switches, on-chip mesh networks, or in other ways as will occur to readers of skill in the art. SMP enables any processor or processing core to work on any task no matter where the data for that task is located in memory, provided that each task in the system is not in execution on two or more processors at the same time. With proper operating system support, SMP systems can easily move tasks between processors to balance the workload efficiently.

Figure 2:
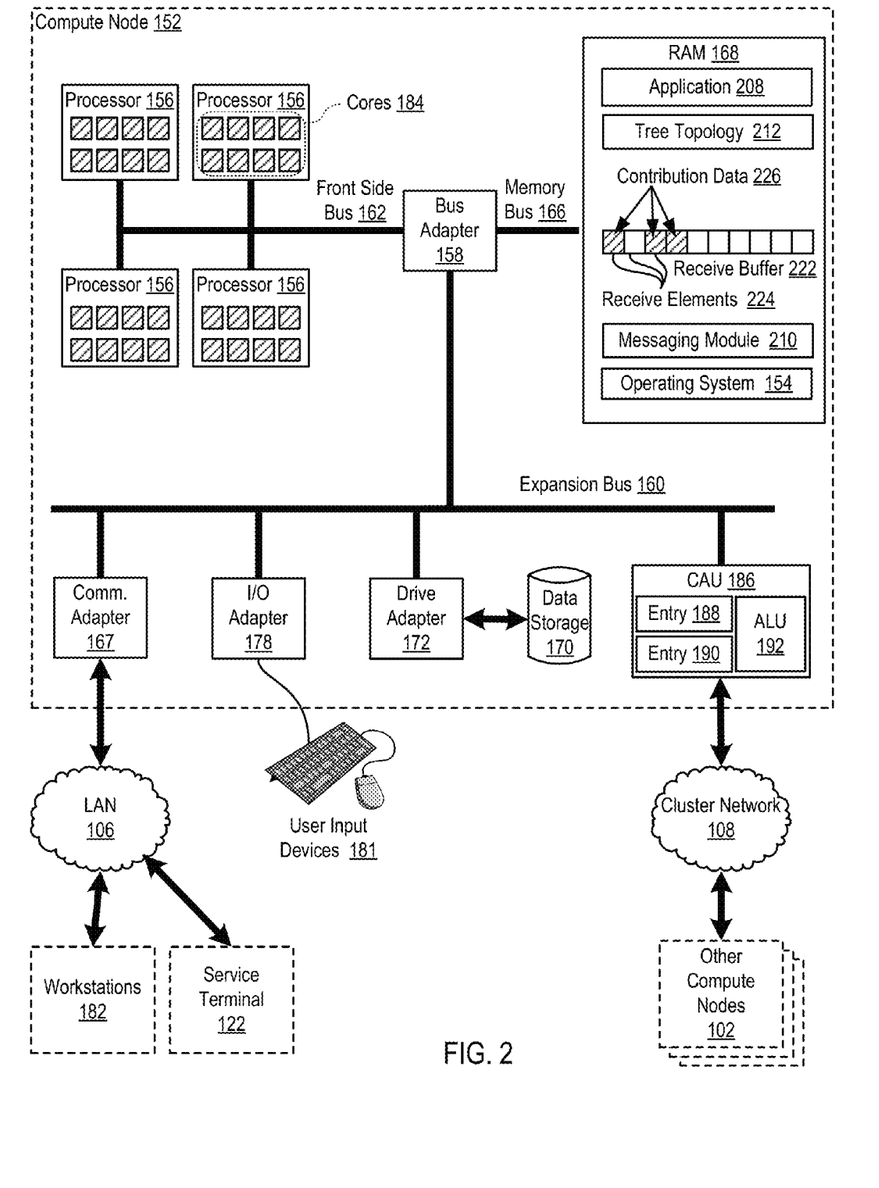
FIG. 2 sets forth a block diagram of an exemplary compute node useful in a parallel computer in which deterministic reductions are performed according to embodiments of the present invention.

The processing cores (184) in the example of FIG. 2 are coupled to random access memory ('RAM') (168) through a high-speed memory bus (166), through a bus adapter (158), and through a front side bus (162). The processing cores are also coupled by expansion bus (160) to other components of the compute node (152). Stored in RAM (168) is an application program (208), a module of computer program instructions that carries out parallel, user-level data processing using parallel algorithms. Also stored in RAM (168) is a messaging module (210), a library of computer program instructions that carry out parallel communications among compute nodes, including collective operations. Application program (208) executes collective operations by calling software routines in the messaging module (210). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (168) is an operating system (154), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The example compute node (152) of FIG. 2 also includes a collective acceleration unit ('CAU') (186). The example CAU (186) is a module of automated computing machinery comprising an aggregation of computer hardware and software configured to accelerate collective operations processing by performing one or more arithmetic operations without use of a processor of the compute node (152). The CAU may include computer memory in any form, including, for example, RAM, EEPROM, registers, a local cache, and so on as will occur to readers of skill in the art. In the example of FIG. 2, the CAU (186) accelerates collective operations processing through use of an arithmetic logic unit ('ALU'). An ALU is a circuit, computer hardware, that performs arithmetic and logical operations. The ALU (192) in the example CAU (186) of FIG. 2 operates to accelerate collective operations processing by performing arithmetic and logical operations without the use of any processor (156). Computer program instructions of a collective operation in parallel communications library (210) may latch an instruction for an arithmetic or logical function into an instruction register of the ALU (192). When the arithmetic or logical function of a reduction operation is a 'sum' or a 'logical or,' for example, the ALU (192) of the CAU (186) may execute the arithmetic or logical operation without relying on a processor (156) to processes the function.

The CAU (186) in the example of FIG. 2 is also coupled for data communications to CAUs of other compute nodes (102) in a cluster network (108). The CAU may be coupled to CAUs of other compute nodes directly through a data communications link or through one or more network devices, such as routers, switches, and the like, comprising the cluster network (108) of FIG. 2. Processors (156) of compute nodes (152, 102) may use the CAUs (186) of compute nodes (152, 102) of the parallel computer to pass data communications messages to one other. In this way, the CAU (186) may operate as a type of communications adapter for the compute node (152). A processor (156) of compute node (152) may, for example, send a data communications message via the CAU (186) to a processor of another compute node (102), to a processor (156) of the same compute node (152), or to another CAU. CAUs themselves may be destinations of data communications messages.

In some embodiments, the CAUs communicate with one another and with processors in accordance with an acknowledgment-based data communications protocol or ACK-based data communications protocol. In embodiments in which CAUs perform data communications in accordance with an ACK-based protocol, a CAU, after sending a first chunk of data—such as a data communications packet—to a recipient, may be restricted from sending a second chunk, until the CAU receives an ACK (acknowledgement) from the recipient.

The CAU (186), as well as each processor (156), of the compute node (152) may be configured in a tree topology with other CAUs and other processors to carry out collective operations in the parallel computer of which the compute nodes (152, 102) are a part. In this specification, the collection of CAUs and processors comprising a tree topology may be referred to as an operational group for ease of explanation. A network topology is a specification of members included in a data communications network and the couplings among the members. A tree topology generally refers to an organization of members of the tree in which each member is coupled (logically or physically) to any combination of a parent and a child. In a binary tree, for example, most members have a parent and two children. In a branched tree, most members have more than two children and one or no parent. In a highly branched tree, a member may have many children; ten or twelve children, for example, and one or no parent. At the top of any tree topology is a root. When members of a tree topology operate to perform a collective operation, any member, including the root of the tree, may be a logical root. A logical root is a member of a tree having a buffer that is an origin of a collective operation or having a buffer that is a destination of results of a collective operation.

A tree network topology (212), as implemented by the parallel compute comprising the compute node (152) of FIG. 2, specifies processors and CAUs to be included in the tree and each processor and CAUs relative positions. A specification of a tree network topology (212) may be expressed in several ways, including, for example, by identifying each CAU's children and parent. In the example of FIG. 2, a tree network topology (212) may be specified by an application (208), the messaging module (210), by a service application executing on a service terminal (122), or by other modules of automated computing machinery.

Processors and CAUs included in a tree topology may be part of the same or different compute nodes. Consider, for example, a tree network topology comprising four compute nodes and a CAU, with the CAU configured as a root of the tree, and the processors configured as children of the root. To implement such a tree topology in the system of FIG. 2, the four processors (156) of the compute node (152) may be the children of the CAU (186), the four processor (156) of the compute node (152) may be the children of a CAU on another compute node (102), some processors (156) of the compute node (152) may be children of CAU (on this or another compute node) along with processors of another compute, and so on. That is, any processor or CAU in a parallel computer configured in accordance with embodiments of the present invention may be organized into a tree topology regardless of the compute node in which the processor or CAU is implemented.

In some embodiments, a tree network topology may be a physical tree topology in which CAUs and processors are physically coupled by data communications link in a manner specified by the network topology—a parent is coupled to children directly, with no intervening CAUs or processors, for example. In other embodiments, the tree network topology may be implemented logically, that is, CAUs and processors may or may not be physically coupled by data communications links in a manner specified by the network topology. Instead, CAUs and processors may be coupled by other CAUs—CAUs not even a part of the tree, in fact. That is, in logical tree network topologies, some CAUs not included in the topology, CAUs not included in the operational group, may pass along data communications to other CAUs and processors included in the logical tree network topology. Such CAUs, however, may not participate otherwise in the operations of the tree network topology. That is, CAUs not included in an operational group of a tree network may pass along data communications to members of the operational group, but may not otherwise participate in collective operations carried out by the operational group.

A CAU may be a member of one or more tree topologies at any time. In some embodiments, for example, a CAU may support—or said another way, be included in—up to 64 unique trees. For each tree that a CAU supports, the CAU includes two entries (188, 190). An entry is a region of computer memory configured to store an operation, such as a reduction operation or a multicast operation, or function that the CAU is to execute. In this way, some collective operations may be pipelined in a particular tree.

In some embodiments, however, the pipelining of collective operations is limited. In such embodiments, only collective operations travelling in the same direction, such as, for example, a sequence of several multicast operations originating from the same member of a tree or a sequence of several allreduce operations originating from the same set of members of the tree. That is, when data communications supporting a sequence of operations flow in the same direction—up or down a tree—the sequence of operations may be pipelined. When a collective operation in a sequence of operations changes the direction in which data communications will flow, however, the sequence is said to include a 'turn-around.' A collective operation that causes a turn-around is referred to here, for ease of explanation, as a turn-around operation. When such a turn-around occurs, members of the tree that are to be senders of data communications in processing the turn-around operation must wait until the previous operation is complete before processing the turn-around operation. Consider, for example, a sequence of broadcast operations originating at a root member of the tree followed by a reduce operation having a destination of reduction results at the same root member. In this example, the sequence of broadcast operations may be pipelined, and the reduce operation causes a turn-around. In the broadcast operations data flows down the tree, while in the reduction operation data flows up the tree. In this example, all children in the tree must wait until the broadcast operations are completed, before processing the reduce operation.

In the example of FIG. 2, several components of compute node (152) may operate together to perform a deterministic reduction in a parallel computer of which the compute node (152) is a part. In the example compute node of FIG. 2, any of the messaging module (210), the user-level application (208), a service application executing on a service terminal (122) or other module of automated computing machinery not shown here may organize a plurality of processors (156) of the parallel computer and a CAU (186) into a branched tree topology (212), where the CAU (186) is a root of the branched tree topology (212) and the processors (156) are children of the root CAU (186).

Also in the example compute node of FIG. 2, any of the messaging module (210), the user-level application (208), a service application executing on a service terminal (122) or other module of automated computing machinery not shown here may establish a receive buffer (222) that includes a plurality of receive elements (224) where each receive element (224) is associated with one of the processors (156) in the branched tree topology (212) and is configured to store the associated processor's contribution data (226). In the example of FIG. 2, the receive buffer (222) comprises ten elements, each associated with one processor. The example receive buffer (222) as depicted in FIG. 2 is presently storing contribution data (226) from three processors (156) of the branched tree topology (212). In the example of FIG. 2, the receive buffer (222) is shown here in main memory of the compute node (152), RAM (168). The CAU (186) in FIG. 2 may access the RAM (168), and the receive buffer (222) stored in RAM (168), through the expansion bus (160), bus adapter (158), and memory bus (166). This, of course, is but one possible implementation among many of computer memory which may be accessible by the CAU (186). In other embodiments, for example, the CAU may be coupled to RAM (168) directly rather than through the expansion bus (160). In another example embodiment, the CAU (186) may be coupled with or include memory designated for use only by the CAU. In such an example embodiment, a receive buffer (222) may also be established in the memory of the CAU itself, rather than in main memory (168) of the compute node (152).

The CAU may receive, in any order from the processors (156) in the branched tree topology (212), each processor's contribution data (222). Receiving each processor's contribution data (222) may also include storing the contribution data in an element (224) of the receive buffer (222) associated with the processor (156). In the system of FIG. 2, any of the application (208), the CAU (186), the messing module (210), or some other module of automated computing machinery not shown here may track receipt of each processor's contribution data (224). The root CAU (186), only after receipt of contribution data (226) from all processors (156) in the branched tree topology (212), reduces the contribution data (226) stored in the receive buffer (222) in a predefined order.

The exemplary compute node (152) of FIG. 2 also includes a communications adapter (167) for implementing data communications with workstations (182), a service terminal (122), and other computers via a LAN (106). Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems that effect hardware acceleration of broadcast operations in a parallel computer according to embodiments of the present invention include modems for wired communications, Ethernet (IEEE 802.3) adapters for wired network communications, and 802.11b adapters for wireless network communications.

The data communications adapter (167) in the example of FIG. 2 may, for example, include a Gigabit Ethernet adapter that couples example compute node (152) for data communications to a Gigabit Ethernet LAN (106). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

Figure 3:
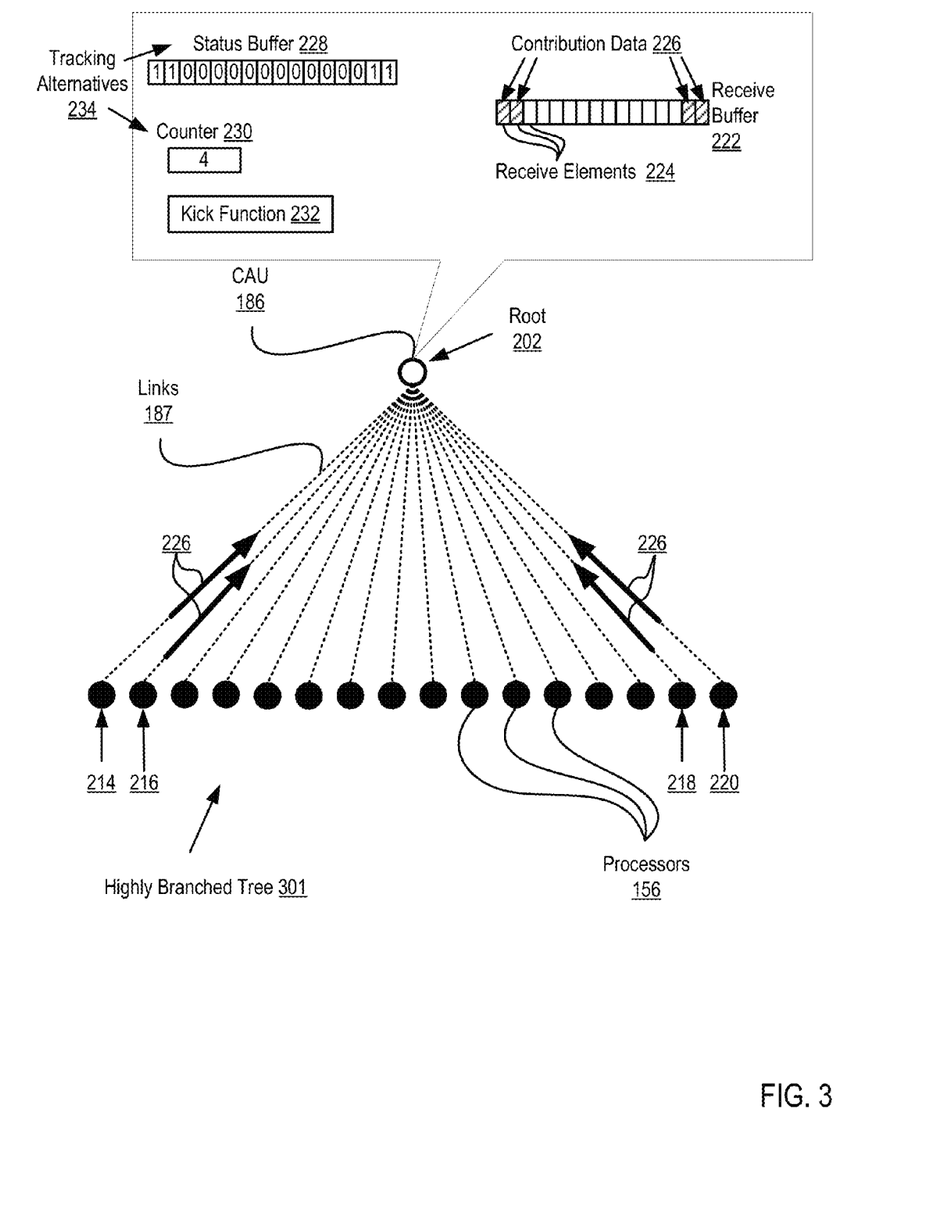
FIG. 3 sets forth a line drawing illustrating an exemplary tree network topology optimized for collective operations useful in a system configured for performing a deterministic reduction operation in a parallel computer in accordance with embodiments of the present invention.

For further explanation, FIG. 3 sets forth a line drawing illustrating an exemplary tree network topology optimized for collective operations useful in a system configured for performing a deterministic reduction operation in a parallel computer in accordance with embodiments of the present invention. In the example of FIG. 3, sixteen processors (156) and one CAU (186) are organized into a tree network topology, more specifically a highly branched tree network topology (301). The tree (301) in the example of FIG. 3 is said to be 'highly' branched in that a root of the tree has many children, in this case sixteen, rather than two as in a binary tree, or three as in a less complex branched tree. Although a binary tree does have 'branches,' a binary tree is limited to two child branches per member of the tree and this specification the term 'branched' refers to trees with greater than two child branches. That is, a branched tree has at least three child branches.

The CAU (186) in the example of FIG. 3 is configured as a root (202) of the tree (301). The processors (156) are configured as children of the root (202) CAU (186). The members of the tree (301)—the operational group—in the example of FIG. 3 may be physically organized as a tree or, more likely, logically organized. As such, the links (187) coupling the processors (156) to the root (202) may physically comprise other components not seen here, including for example, other CAUs configured to pass data communications among the processors (156) and CAU (186), other network devices, such as routers and switches, and data communications cables.

The tree (301) may perform any number of collective operations, including, for example, a reduce operation that specifies a particular reduction operation to perform. Consider, as an example, a reduce operation in which contents of the processors' send buffers, referred to in this specification as contribution data, are to be passed to the root's (202) receive buffer and reduced by root (202) by summing the contents pair-wise. In this example, the contribution data may be said to flow 'up' the tree. By contrast, a broadcast operation in which contribution data is sent from the root (202) to the children processors (156) may be said to flow 'down' the tree.

In carrying out reduce operations with the highly branched tree (301) of FIG. 3, the processors (156) may provide contribution data (226) to the root (202) CAU (186) in any order. As depicted in FIG. 3, for example, four processors (214, 216, 218, and 220) have provided contribution data (226) to the root CAU (186). If the root (202) is configured to reduce the contribution data pair-wise as the contribution data is received, that is, stochastically rather than deterministically, upon each subsequent reduce operation, the order in which the root reduces contribution data may vary. Consider, as an example of performing reduction operations stochastically in the highly branched tree (301) of FIG. 3, two subsequent reduction operations. In the first reduction operation, the two processors (214, 216) on the far left of the tree may be the first to send their contribution data to the root (202) and, as such, the root (202) will reduce the contribution data of the two processors (214, 216) pair-wise, before any others. In the second reduction operation, the two processors (218, 220) on the far right of the tree (301) may be the first to send their contribution data to the root (202) and, as such, the root (202) will reduce the contribution data of the two processors (218, 220) pair-wise, before any others. That is, in this stochastic example, the root reduces the far left processors' (214, 216) contribution data first in the first example reduction operation, while in the second, the root reduces the far right processors' (218, 220) contribution data first. For various reasons, including for example, round-off techniques employed in carrying out floating point operations, this non-deterministic, stochastic approach may provide imprecise results over subsequent reduce operations.

The example highly branched tree (301) of FIG. 3, however, is configured for performing a deterministic reduction operation in a parallel computer in accordance with embodiments of the present invention. In the example of FIG. 3, the CAU (186) has establishes a receive buffer (222) in memory of the CAU (186), where the receive buffer (222) includes a plurality of receive elements (224), one for each processor (156) in the tree (301). Each of the receive elements (222) is associated with one of the processors (156) and is configured to store the associated processor's contribution data (226). The root CAU (186), as the root (202) of the tree (301), may receive, in any order from the processors (156) in the branched tree topology (301), each processor's contribution data (224). In the example of FIG. 3, the CAU (186) has received contribution data (226) from four processors (214, 216, 218, and 220) and stored the contribution data (226) in an associated receive element (224) of the receive buffer (222).

In the example of FIG. 3, the CAU (186) is configured to track receipt of each processor's contribution data (226). Two tracking alternatives (234) are depicted in the example of FIG. 3. The CAU (186) may track receipt of contribution data (226) by establishing a status buffer (228) that includes a plurality of elements, with each element associated with one of the processors in the branched tree topology. Each element, or the value stored in the element, represents the receipt status of contribution data of one of the processors. Upon receipt of each processor's contribution data, the CAU (186) may set a flag in an element of the status buffer to indicate the receipt of the processor's contribution data. Consider, as an example of tracking receipt of contribution data (226) with a status buffer, such as the status buffer (228) of FIG. 3, that upon receipt of contribution data from processor (214), the CAU (186) sets a flag in the far-left element of the status buffer (228). In this example, the 'flag' is a logic '1.' That is, an element including a logic '1' value indicates that contribution data from a processor associated with that element has been received by the CAU (186). When all elements of the status buffer (228) include a logic '1' value, contribution data has been received by the CAU from all child processors (156).

The CAU (186) may also track receipt of contribution data (226) by maintaining a count (230) of the number of processors from which contribution data (226) has been received. When the value of the example counter (230) of FIG. 3 is equal to the number of processors (156) in the highly branched tree (301)—16 processors—contribution data has been received by the CAU from all child processors.

In the example of FIG. 3, the CAU (186) reduces the contribution data (226) stored in the receive buffer (222) in a predefined order only after receipt of contribution data from all processors (156) in the branched tree topology (301). The CAU (186) may reduce the contribution data when every element of the status buffer (228) is a logical '1' value, or when the counter (230) has a value of 16, depending upon the tracking alternative (234) employed in the branched tree topology (301). The CAU (186) is effectively restricted from reducing contribution data until all processors have contributed and the CAU (186) reduces that contribution data in a predefined order. In this way, in subsequent reduction operations, contribution data may be reduced in the same predefined order—that is, reduce operations are carried out deterministically.

In some embodiments, tracking (234) is carried out by another component of the tree, (301), or the parallel computer. An application, messaging module, processor within the tree, processor not within the tree, or some other module of automated computing machinery, for example, may track receipt of contribution data. In such embodiments, the module carrying out the tracking of contribution data may provide to the CAU after receipt of contribution data from all processor in the branched tree topology a kick function (232) to perform. A kick function, is a module of computer program instructions or a pointer to such a module, that when executed by a CAU causes the CAU to reduce contribution data in the receive buffer. Such a kick function may be provided to the CAU in various ways, including, for example, by side-loading in an out-of-band manner, the instructions of the function into a register of the CAU. If the receive buffer (222) is implemented and maintained in a memory location other than the CAU's local memory, the kick function (232) may also include a pointer to the receive buffer. In embodiments in which a module provides such a kick function (232) to the CAU to execute, reducing contribution data includes reducing the contribution data in response to executing the kick function (232). Upon completion of the reduction, the CAU may also be configured to signal a user-level application of the completion.

Figure 4:
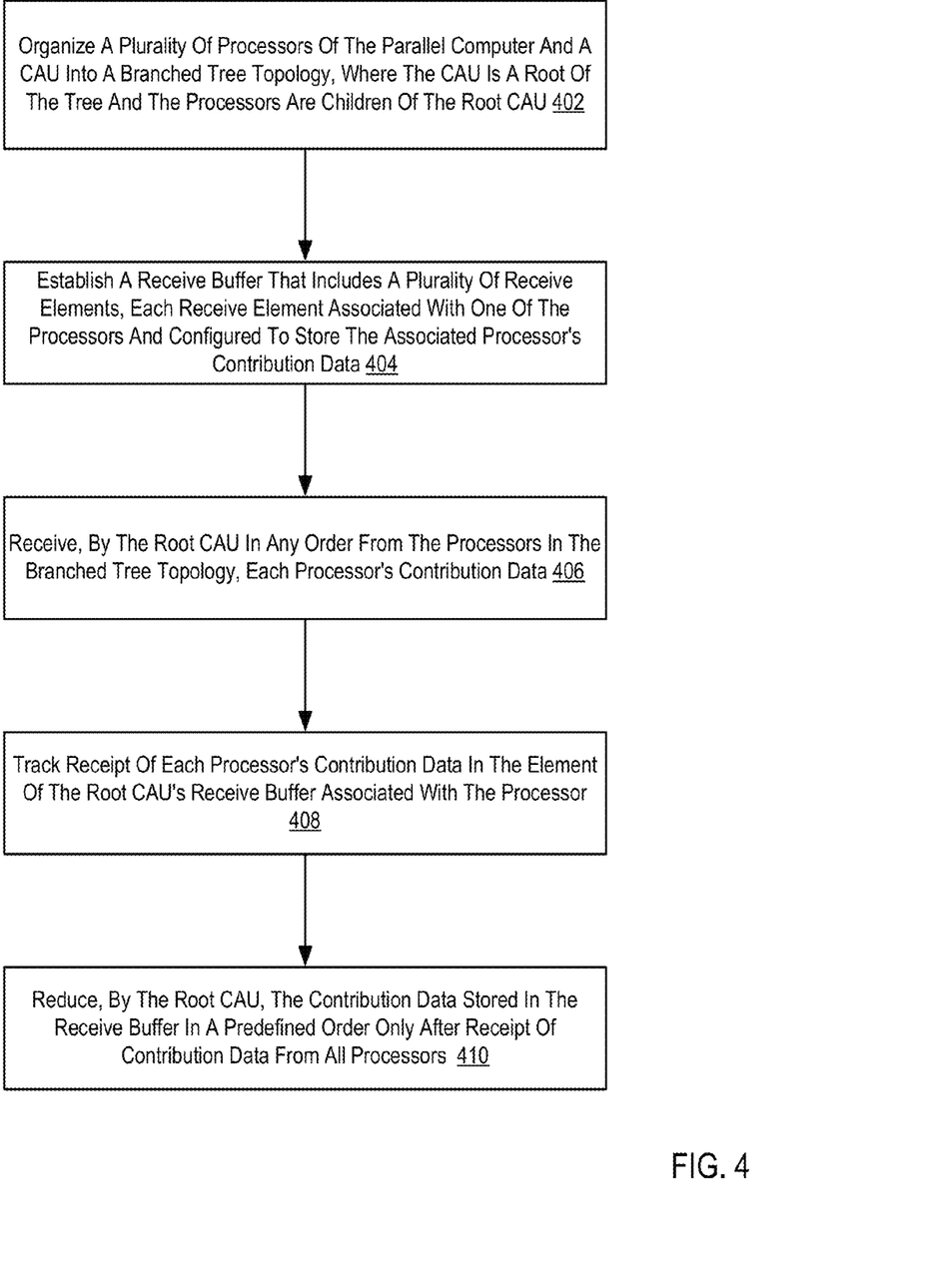
FIG. 4 sets forth a flow chart illustrating an exemplary method for performing a deterministic reduction operation in a parallel computer according to embodiments of the present invention.

For further explanation, FIG. 4 sets forth a flow chart illustrating an exemplary method for performing a deterministic reduction operation in a parallel computer according to embodiments of the present invention. The method of FIG. 4 is carried out in a parallel computer (100 of FIG. 1) that includes a plurality of compute nodes (102 on FIG. 1). Each of the compute nodes includes a plurality of computer processors (156 on FIG. 2) and a CAU (186 on FIG. 2). The CAU couples the computer processors of the compute nodes to one another for data communications in a cluster data communications network.

The method of FIG. 4 includes organizing (402) a plurality of processors of the parallel computer and a CAU into a branched tree topology. In the method of FIG. 4, the CAU is a root of the branched tree topology and the processors are children of the root CAU. Organizing (402) a plurality of processors and a CAU into a tree may be carried out by providing to each of the processors and the CAU a data structure specifying relative positions and logical couplings among members of the tree.

The method of FIG. 4 also includes establishing (404) a receive buffer that includes a plurality of receive elements. In the method of FIG. 4, each receive element is associated with one of the processors in the branched tree topology. Each receive element is also configured to store the associated processor's contribution data. Establishing (404) a receive buffer may be carried out in various ways, including for example, by allocating memory space for and initializing in the memory space, an array having length (number of elements) equal to the number of processors (children) of the CAU.

The method of FIG. 4 also includes receiving (406), by the root CAU in any order from the processors in the branched tree topology, each processor's contribution data. Receive (406) contribution data may also include storing the contribution data in an element of the receive buffer associated with the processor form which the contribution data is received.

The method of FIG. 4 also includes tracking (408) receipt of each processor's contribution data and reducing (410), by the root CAU, only after receipt of contribution data from all processors in the branched tree topology, the contribution data stored in the receive buffer in a predefined order. Reducing contribution data may include performing an arithmetic operation, such as a sum, or a logical operation, such as a bitwise 'OR' operation, taking the contribution data pairwise.

Figure 5:
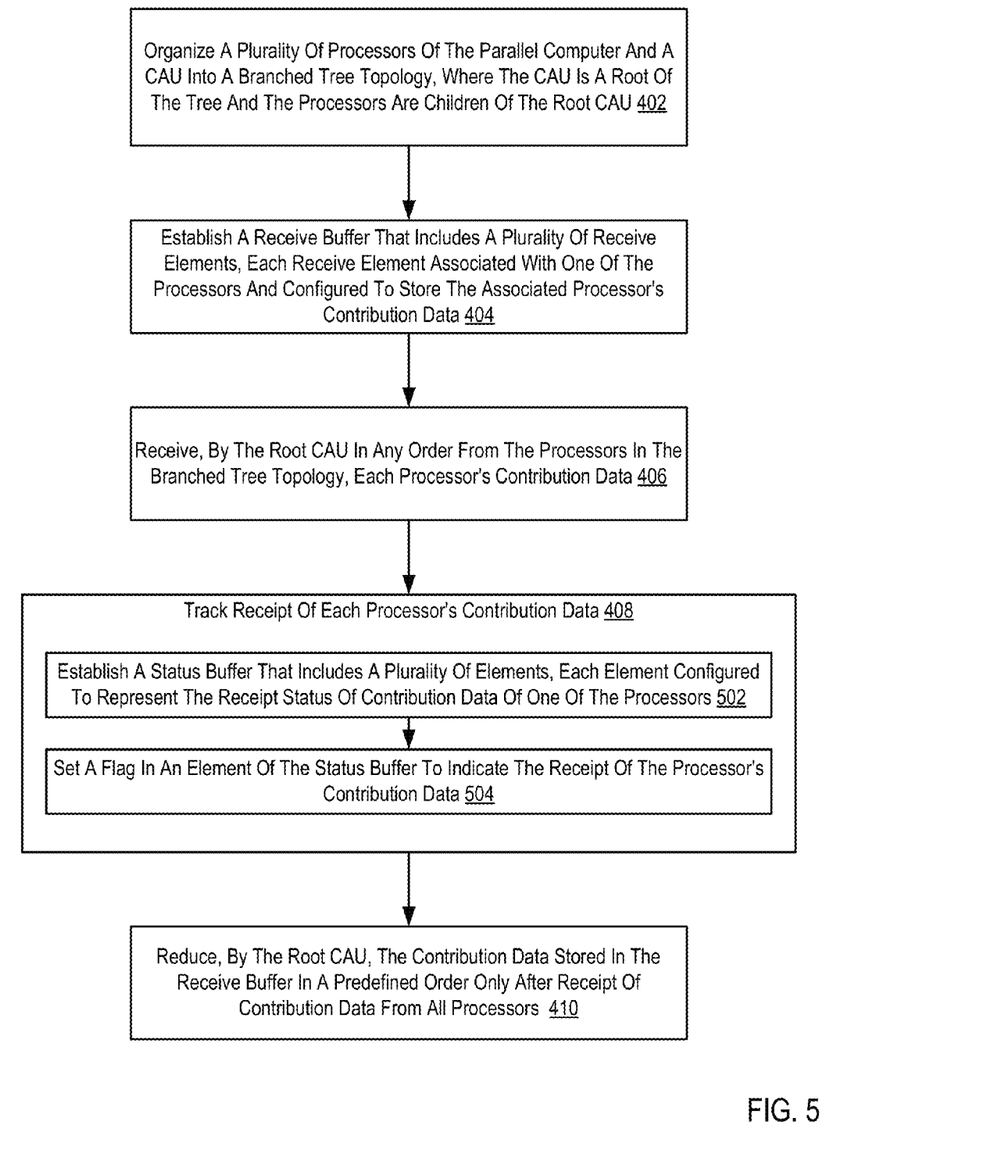
FIG. 5 sets forth a flow chart illustrating a further exemplary method for performing a deterministic reduction operation in a parallel computer according to embodiments of the present invention.

For further explanation, FIG. 5 sets forth a flow chart illustrating a further exemplary method for performing a deterministic reduction operation in a parallel computer according to embodiments of the present invention. The method of FIG. 5 is similar to the method of FIG. 4 in that the method of FIG. 5 is also carried out in a parallel computer (100 of FIG. 1) that includes a plurality of compute nodes (102 on FIG. 1). Each of the compute nodes includes a plurality of computer processors (156 on FIG. 2) and a CAU (186 on FIG. 2). The CAU couples the computer processors of the compute nodes to one another for data communications in a cluster data communications network. The method of FIG. 5 is also similar to the method of FIG. 4 in that the method of FIG. 5 includes organizing (402) processors and a CAU into a branched tree topology, establishing (404) a receive buffer, receiving (406) each processor's contribution data, tracking (408) receipt of each processor's contribution data, and reducing (410) the contribution data stored in the receive buffer in a predefined order.

The method of FIG. 5 differs from the method of FIG. 4, however, in that in the method of FIG. 5 tracking (408) receipt of each processor's contribution data is carried out by establishing (408) a status buffer that includes a plurality of elements. Each of the elements of the status buffer is associated with one of the processors in the branched tree topology and each of the elements is configured to represent the receipt status of contribution data of one of the processors in the branched tree topology. Tracking (408) receipt of each processor's contribution data in the method of FIG. 5 also includes setting, upon receipt of each processor's contribution data, a flag in an element of the status buffer to indicate the receipt of the processor's contribution data.

Figure 6:
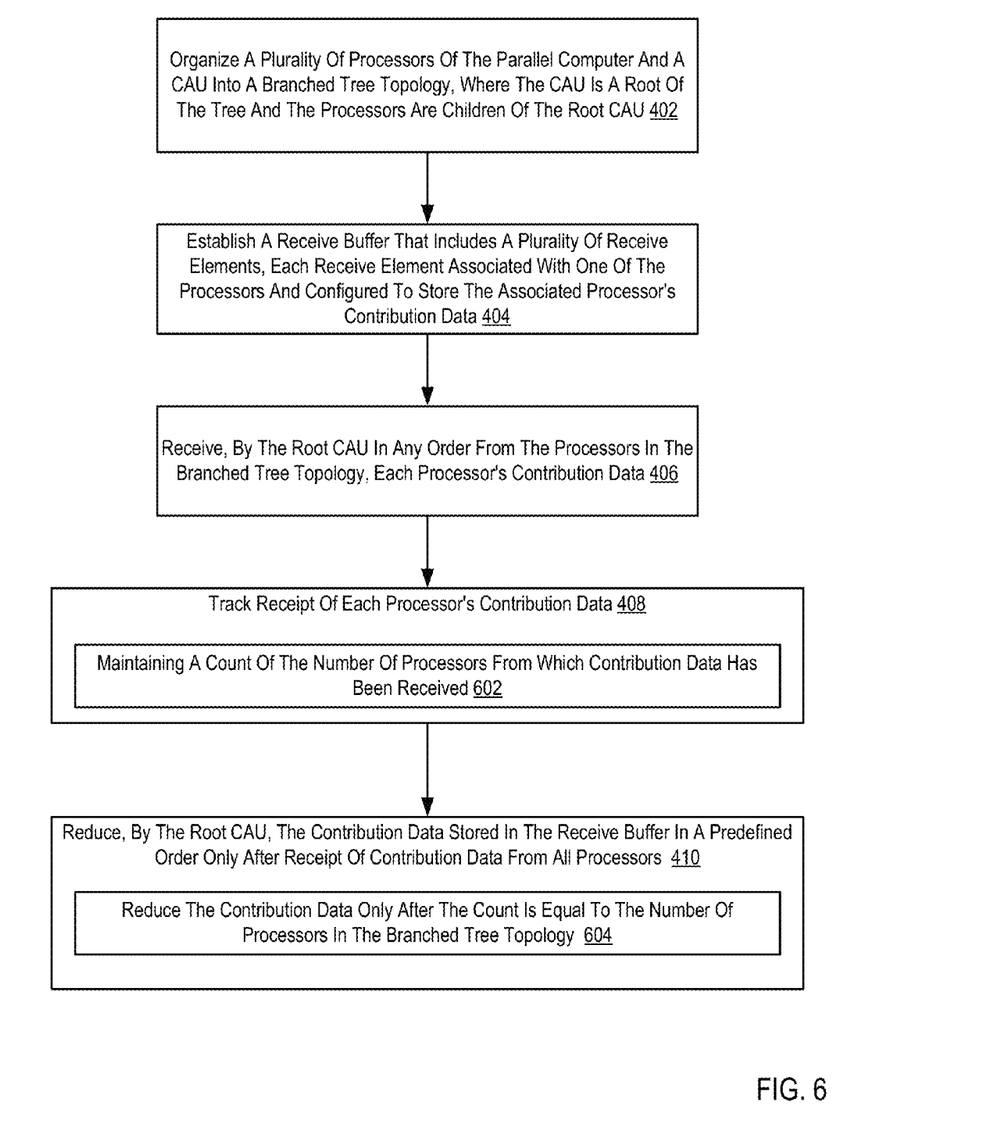
FIG. 6 sets forth a flow chart illustrating a further exemplary method for performing a deterministic reduction operation in a parallel computer according to embodiments of the present invention.

For further explanation, FIG. 6 sets forth a flow chart illustrating a further exemplary method for performing a deterministic reduction operation in a parallel computer according to embodiments of the present invention. The method of FIG. 6 is similar to the method of FIG. 4 in that the method of FIG. 6 is also carried out in a parallel computer (100 of FIG. 1) that includes a plurality of compute nodes (102 on FIG. 1). Each of the compute nodes includes a plurality of computer processors (156 on FIG. 2) and a CAU (186 on FIG. 2). The CAU couples the computer processors of the compute nodes to one another for data communications in a cluster data communications network. The method of FIG. 6 is also similar to the method of FIG. 4 in that the method of FIG. 6 includes organizing (402) processors and a CAU into a branched tree topology, establishing (404) a receive buffer, receiving (406) each processor's contribution data, tracking (408) receipt of each processor's contribution data, and reducing (410) the contribution data stored in the receive buffer in a predefined order.

The method of FIG. 6 differs from the method of FIG. 4, however, in that in the method of FIG. 6, tracking (408) receipt of each processor's contribution data is carried out by maintaining (602) a count of the number of processors from which contribution data has been received and reducing (410) the contribution data stored in the receive buffer in a predefined order is carried out by reducing (604) the contribution data only after the count is equal to the number of processors in the branched tree topology.

Figure 7:
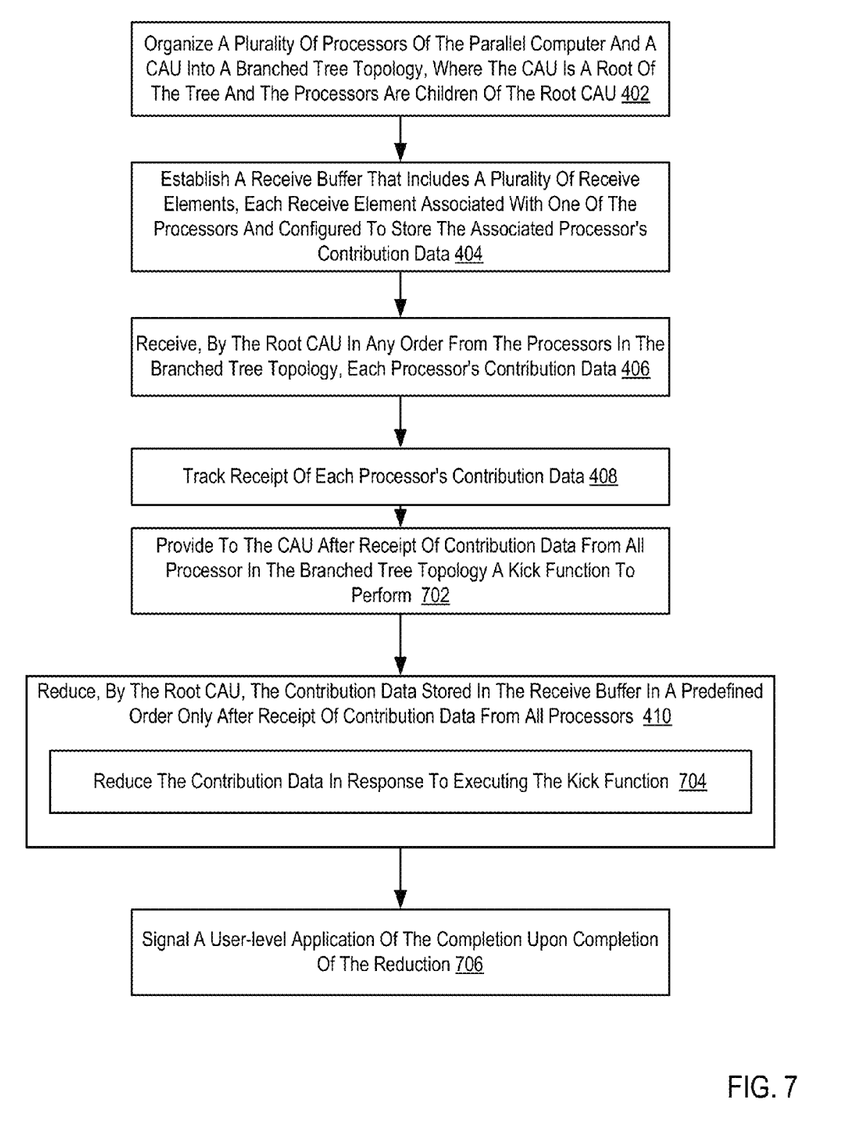
FIG. 7 sets forth a flow chart illustrating a further exemplary method for performing a deterministic reduction operation in a parallel computer according to embodiments of the present invention.

For further explanation, FIG. 7 sets forth a flow chart illustrating a further exemplary method for performing a deterministic reduction operation in a parallel computer according to embodiments of the present invention. The method of FIG. 7 is similar to the method of FIG. 4 in that the method of FIG. 7 is also carried out in a parallel computer (100 of FIG. 1) that includes a plurality of compute nodes (102 on FIG. 1). Each of the compute nodes includes a plurality of computer processors (156 on FIG. 2) and a CAU (186 on FIG. 2). The CAU couples the computer processors of the compute nodes to one another for data communications in a cluster data communications network. The method of FIG. 7 is also similar to the method of FIG. 4 in that the method of FIG. 7 includes organizing (402) processors and a CAU into a branched tree topology, establishing (404) a receive buffer, receiving (406) each processor's contribution data, tracking (408) receipt of each processor's contribution data, and reducing (410) the contribution data stored in the receive buffer in a predefined order.

The method of FIG. 7 differs from the method of FIG. 4, however, in that the method of FIG. 7 includes providing (702) to the CAU after receipt of contribution data from all processor in the branched tree topology a kick function to perform. A kick function is a module of computer program instruction that when executed by the CAU cause the CAU to reduce (410) the contribution data stored in the receive buffer in a predefined order. In the method of FIG. 7, reducing (410) the contribution data stored in the receive buffer in a predefined order is carried out by reducing (704) the contribution data in response to executing the kick function. Upon completion of the reduction, the method of FIG. 7 continues by signaling (706) a user-level application of the completion.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of performing a deterministic reduction operation in a parallel computer, the parallel computer comprising a plurality of compute nodes, each compute node comprising a plurality of computer processors and a CAU (Collectives Acceleration Unit), the CAU coupling computer processors of compute nodes to one another for data communications in a cluster data communications network, the method comprising:
   organizing three or more processors of the parallel computer and a CAU into a highly branched tree topology, wherein the CAU is a root of the highly branched tree topology and each processor in the highly branched tree topology is a direct child of the root CAU;
   establishing a receive buffer comprising a plurality of receive elements, each receive element associated with one of the processors in the highly branched tree topology and configured to store the associated processor's contribution data;
   receiving, by the root CAU in any order from the processors in the highly branched tree topology, each processor's contribution data;
   tracking receipt of each processor's contribution data wherein tracking receipt of each processor's contribution data further comprises maintaining a count of the number of processors from which contribution data has been received; and
   reducing, by the root CAU, only after receipt of contribution data from all processors in the highly branched tree topology, the contribution data stored in the receive buffer in a predefined order wherein reducing the contribution data stored in the receive buffer in a predefined order further comprises reducing the contribution data only after the count is equal to the number of processors in the highly branched tree topology.

2. The method of claim 1 further comprising:
   providing to the CAU after receipt of contribution data from all processor in the highly branched tree topology a kick function to perform;
   wherein reducing the contribution data stored in the receive buffer in a predefined order further comprises reducing the contribution data in response to executing the kick function.

3. The method of claim 2 further comprising:
   upon completion of the reduction, signaling a user-level application of the completion.

4. The method of claim 1 wherein each processor comprises an 8-core central processing unit ('CPU'), each node comprises four processors, and the four processors of each node comprise a 32-way symmetric multiprocessing system ('SMP').

5. The method of claim 1 wherein each CAU further comprises an arithmetic logic unit ('ALU') and is configured to accelerate collective operations processing by performing one or more arithmetic operations without use of a processor of a compute node.

* * * * *